Nov. 3, 1931.  R. M. ROWE  1,830,245
BRUSH CUTTING APPARATUS
Filed March 21, 1930  4 Sheets-Sheet 4
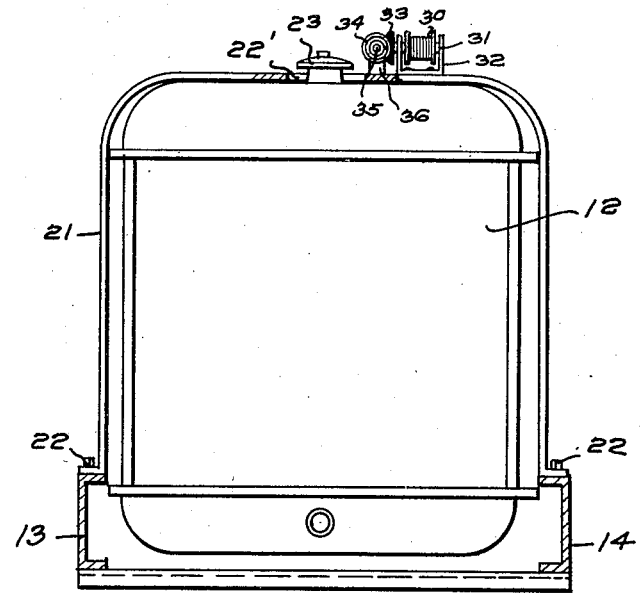
Fig. 4.
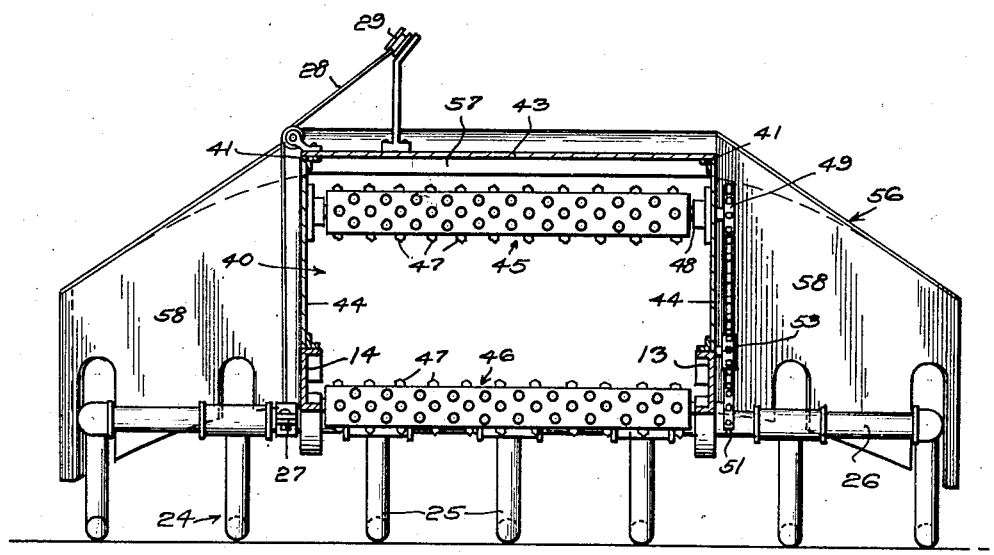
Fig. 5.
INVENTOR.
R. M. ROWE,
BY
ATTORNEY.

Patented Nov. 3, 1931

1,830,245

UNITED STATES PATENT OFFICE

ROY M. ROWE, OF WENATCHEE, WASHINGTON

BRUSH CUTTING APPARATUS

Application filed March 21, 1930. Serial No. 437,863.

My invention is a brush cutting apparatus.

The apparatus is designed to gather up cut brush or branches, which lie upon the ground after fruit trees or the like have been pruned. These gathered up brush or branches are fed rearwardly to a cutter and are finely cut and discharged upon the ground, whereby they may serve as fertilizer.

Figure 1:
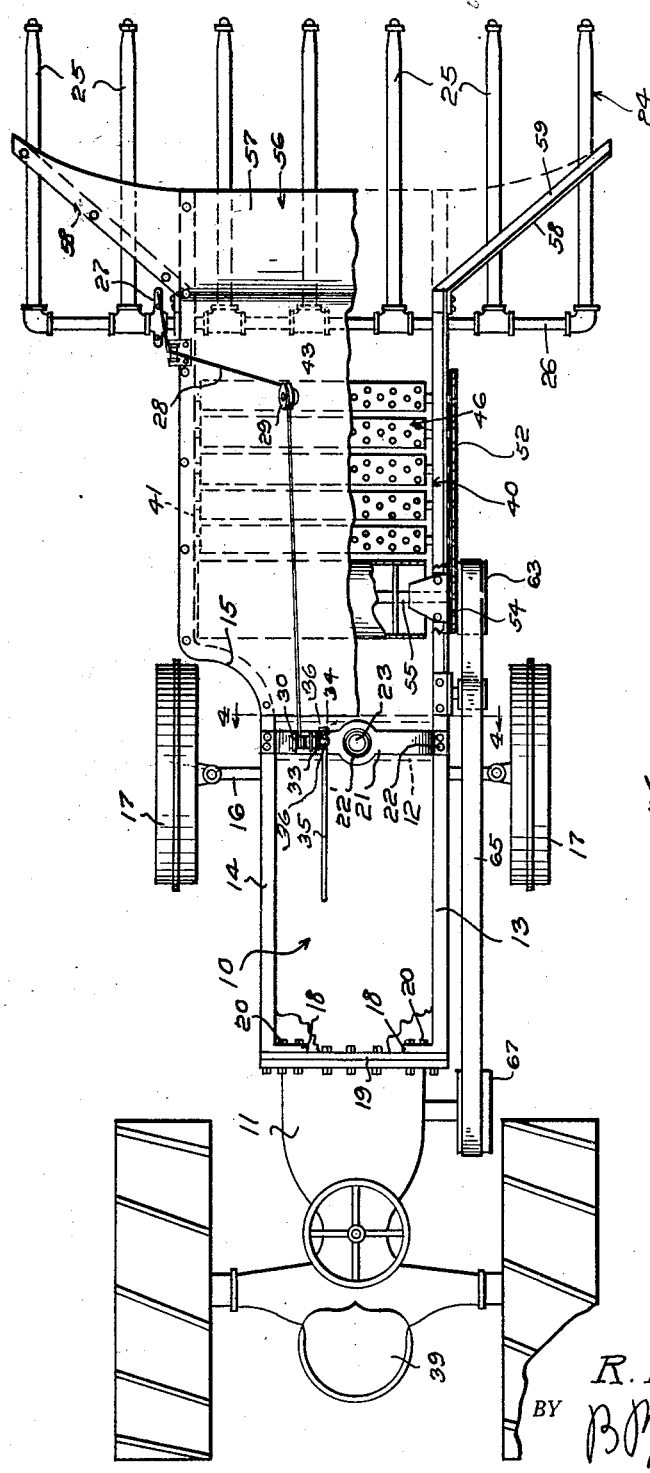
Figure 2:
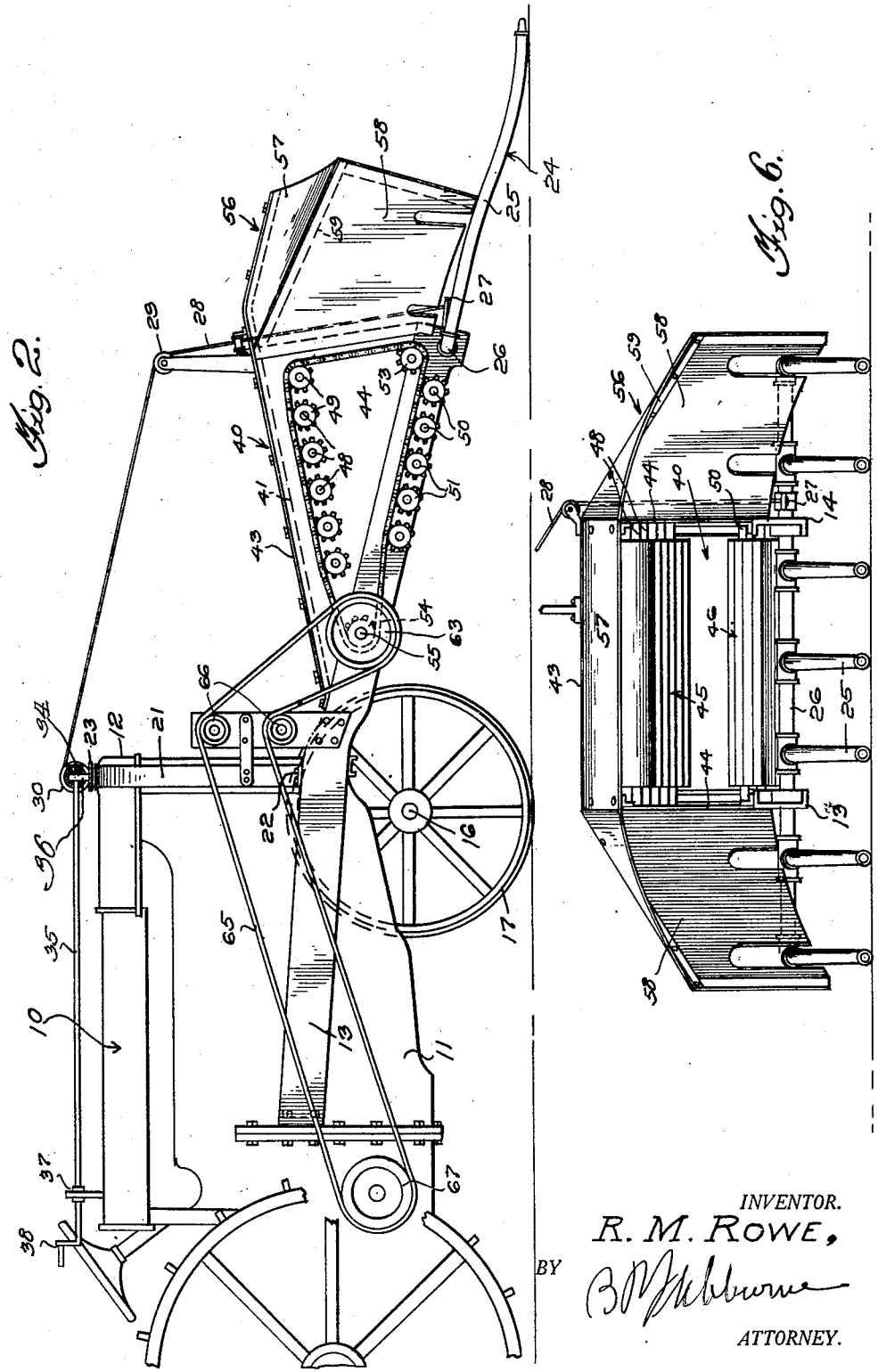
Figure 3:
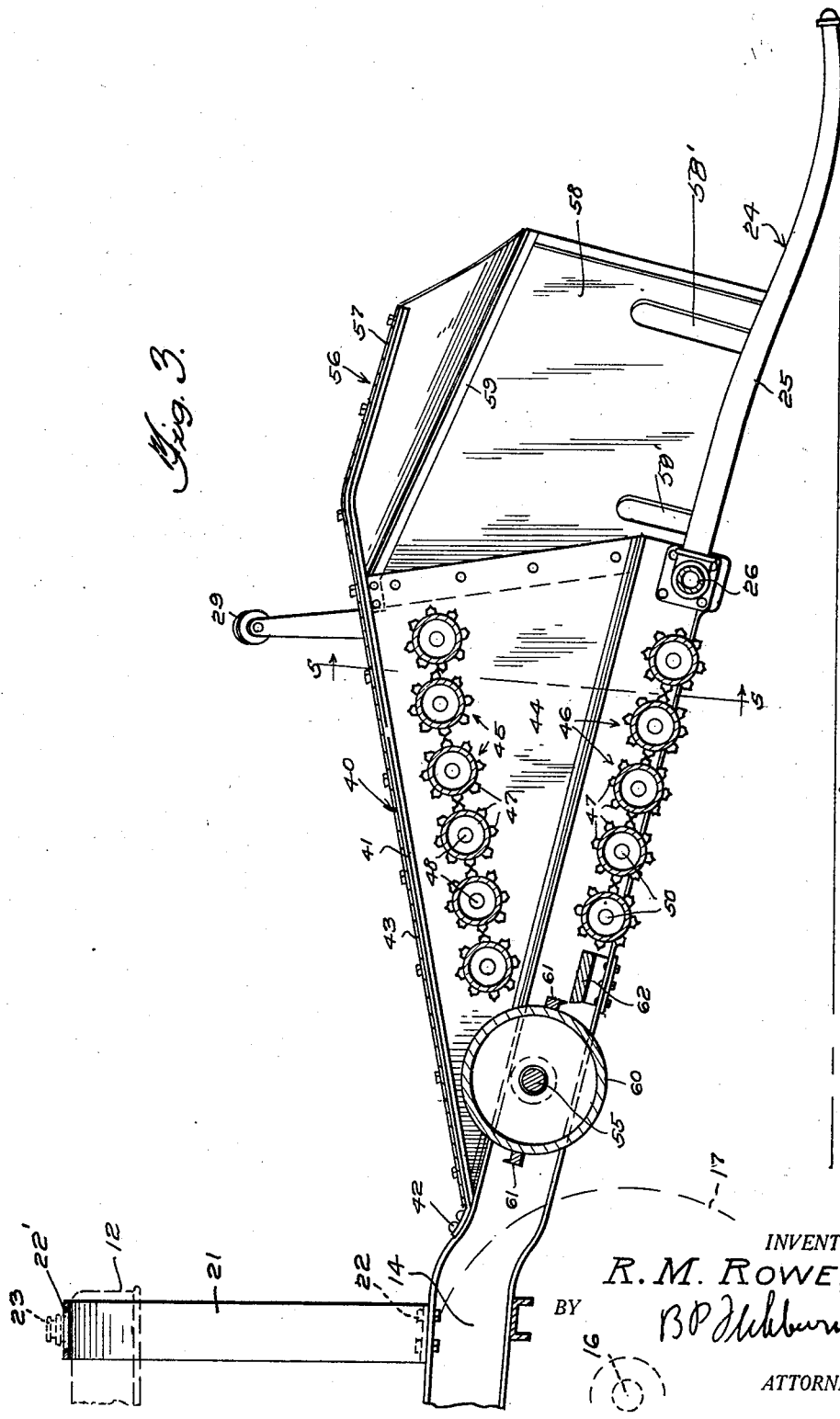

In the accompanying drawings, forming a part of this specification, and in which like numerals are employed to designate like parts throughout the same, Figure 1 is a plan view of apparatus embodying my invention, Figure 2 is a side elevation of the same, Figure 3 is a central vertical longitudinal section through the apparatus, Figure 4 is a transverse section taken on line 4—4 of Figure 1, Figure 5 is a transverse setcion taken on line 5—5 of Figure 3, and, Figure 6 is a front end elevation of the apparatus.

In the drawings, wherein for the purpose of illustration, is shown a preferred embodiment of my invention, the numeral 10 designates a tractor as a whole, of any well known or preferred type. This tractor embodies the usual housing 11, constituting the body portion of the same, and a radiator 12.

The brush cutting apparatus is preferably in the nature of an attachment to be applied to the tractor and such apparatus embodies a main frame including longitudinal beams 13 and 14, which may be formed of angle iron or the like. The beam 14 is bent laterally or offset laterally at 15. The beams 13 and 14 are disposed upon opposite sides of the body portion of the tractor above the axle 16 of the same and do not interfere with the steering operation of the front wheels 17. At their rear ends, these beams 13 and 14 are provided with lateral extensions 18, and are attached to the flanges 19 of the crank case or housing 11 by means of the bolts 20, which serve to retain these flanges together. An inverted generally U-shaped yoke 21 is bolted or otherwise rigidly attached to the beams 13 and 14, near their intermediate portions, as shown at 22, and this yoke is adapted to straddle and rest upon the radiator 12. The yoke 21 is provided in its top with an opening 22' for receiving the water inlet neck or tube 23 of the radiator.

Arranged at the forward end of the frame is a rake 24, embodying tines 25, extending longitudinally of the direction of travel of the apparatus, and these tines are carried by a transverse back 26, which is pivotally mounted upon the forward ends of the beams 13 and 14, any suitable means being employed to prevent the back 26 shifting in a direction transversely of the beams 13 and 14. The tines 25, in operation, are inclined forwardly from thir point of support so that their take up ends may travel in engagement with or in close relation to the ground.

Means are provided to vertically adjust or raise the rake, including a crank 27, which is rigidly clamped to the back 26, and this crank is connected with a flexible element or cable 28, passing about a pulley 29, and wound upon a drum 30, carried by a shaft 31. This shaft is journaled in a bracket 32 rigidly attached to the top of the yoke 21. The shaft 31 is driven by a bevel gear 33, engaging a bevel gear 34, rigidly mounted upon a shaft 35 extending longitudinally above the top of the tractor. The forward end of this shaft is journaled in a bearing 36 secured to the top of the yoke 21, and the rear end of the shaft 35 is journaled in a bearing 37, suitably attached to the rear portion of the tractor. The shaft 35 is provided at its rear end with a crank 38 so that the same may be manually turned by the driver at the seat 39. When the apparatus is being moved to and from its place of operation, the rake is raised so that it will not engage with the ground or obstructions, and it may also be necessary to raise or vertically adjust the rake during the operation of the apparatus, to avoid obstructions, and to accommodate the same to irregularities in the surface of the ground.

A feeding housing 40 is formed upon the forward ends of the beams 13 and 14. This housing embodies a rigid framework, including the forward ends of the beams 13 and 14, and angle irons 41, arranged above these beams, the angle irons and beams diverging forwardly. The rear ends of the angle irons 41 are bolted or rigidly attached to the beams 13 and 14, as shown at 42. The feeding housing embodies a top 43 formed of sheet or plate metal, attached to the angle irons 41, and sides 44, formed of sheet or plate metal, attached to the beams 13 and 14 and angle irons 41. The feeding housing is closed upon its two sides and top and tapers vertically rearwardly but is straight horizontally rearwardly.

Arranged within the feeding housing 40 are upper and lower longitudinal rows or sets of feeding rolls 45 and 46, having teeth 47. These upper and lower sets of feeding rolls are spaced and diverge forwardly, corresponding to the shape of the feeding housing. The upper set of rolls 45 are carried by shafts 48, journaled in the sides 44 or suitable bearings carried thereby. Sprocket wheels 49 are rigidly mounted upon the ends of the shafts 48. The lower sets of rolls 46 are carried by shafts 50 journaled in the beams 13 and 14, or suitable bearings formed thereon, and the shafts 50 are driven by sprocket wheels 51, as shown. The sprocket wheels 49 are engaged by a sprocket chain 52, engaging about the tops of the same and this sprocket chain also engages an idler sprocket wheel 53, suitably mounted upon the forward end of the beam 13. The sprocket chain has its lower run engaging the sprocket wheels 51 at their tops. The rear end of the sprocket chain 52 engages a sprocket wheel 54, rigidly mounted upon a rotary cutter shaft 55. It is thus seen that all of the feed rolls in the upper set rotate in the same direction and are driven clockwise, Figure 2, and all of the rolls 50 in the lower set rotate in the same direction and are driven counterclockwise so that the two sets of rolls will engage with the brush or branches and feed the same rearwardly through the rearwardly diverging or contracting space between the sets of rolls. By virtue of the rearwardly converging arrangement of the sets of feeding rolls, the brush or branches are properly engaged by the rolls to effect the feeding, and the brush is compressed, to some extent, and properly held in proximity to the rotatable cutter, to be described.

A forwardly flaring gathering shield 56 is formed at the forward or intake end of the feeding housing and embodies a top 57 and forwardly diverging sides 58, while the bottom of the gathering shield is open and is covered by the tines 25. This gathering shield is reinforced by a suitable framework 59. The gathering shield extends for the entire width of the rake, and as the apparatus is moved forwardly, the rake will collect the brush or branches which will pass rearwardly into the gathering shield, and be delivered by it to the feeding housing. The sides 58 have vertical slots 58', to receive the outer tines 25, so that the rake may be vertically adjusted within limits.

Disposed at the rear of the sets of feeding rolls, is cutting means, embodying a rotary cutting cylinder 60, having blade or blades 61, for co-action with a stationary blade 62 arranged rearwardly of and adjacent to the lower set of rolls 46. The cylinder 60 is rigidly mounted upon the shaft 55. The brush or branches fed rearwardly by the upper and lower feeding rolls is compressed, to some extent, and delivered to the cylinder 60 to be acted upon by the rotating blades 61 and stationary blade 62, the brush being finely cut or divided and discharged beneath the cylinder 60 upon the ground to serve as fertilizer or the like.

The shaft 55 is driven by a pulley 63, engaged by a belt 65, extending over guide pulleys 66. This belt extends rearwardly and is driven by a pulley 67, operated by the tractor, as is well known.

The operation of the apparatus is as follows:

The apparatus is moved or driven by the tractor in a forwardly direction over the ground, upon which the cut brush or branches are strewn. The rake 24 gathers up the brush or branches and the forward movement of the apparatus delivers the same into the gathering shield, which diverges rearwardly and in turn delivers the brush to the forward intake end of the feeding housing. The brush or branches within the feeding housing are engaged by the toothed rolls 45 and 46, and positively fed by them rearwardly. The action of these rolls and the feeding housing not only serves to positively feed the brush or branches but presses the same, to a certain extent and suitably holds them in proximity to the rotating cutting cylinder 61, so that they will be acted upon by the rotary cutting blades 60 and stationary cutting blade 62. The brush or branches is, therefore, finely divided or cut and discharged upon the ground and will serve as fertilizer.

It is to be understood that the form of my invention, herewith shown and described, is to be taken as a preferred example of the same, and that various changes in the shape, size and arrangement of parts, may be resorted to without departing from the spirit of my invention, or the scope of the subjoined claims.

Having thus described by invention, I claim:

1. In apparatus for gathering up and cutting brush or branches, a feeding housing, a rotary cutter arranged within the housing, spaced feeding devices arranged within the housing in advance of the rotary cutter, a forwardly flaring gathering shield connected with the forward end of the housing, and a rake connected with the forward end of the housing and extending across and forwardly beyond the shield.

2. In apparatus for gathering up and cutting brush or branches, a feeding housing, a rotary cutter arranged within the housing, spaced feeding devices arranged within the housing in advance of the rotary cutter and converging rearwardly toward the same, a forwardly flaring gathering shield arranged at the forward end of the housing, and a rake connected with the forward end of the housing and extending across and forwardly beyond the shield.

3. In apparatus for gathering up and cutting brush or branches, a feeding housing, cutting mechanism arranged within the housing, spaced feeding devices arranged within the housing in advance of the cutting mechanism and converging rearwardly toward the same, a rake arranged in advance of the housing and pivotally connected therewith to be vertically adjusted, and a forwardly flaring gathering shield attached to the forward end of the housing and extending over substantially the entire width of the rake.

4. In apparatus for gathering up and cutting brush or branches, a frame comprising a pair of longitudinal beams to be arranged upon the opposite sides of a tractor, means whereby the rear ends of the beams are attached to the tractor, a yoke secured to the intermediate portions of the beams and extending over the radiator of the tractor said yoke having an opening in its top to receive the water inlet neck of the radiator, thereby limiting the extent of movement of the yoke with relation to the radiator, a housing mounted upon the forward portion of the beams, cutting means arranged within the housing, and means to gather up and feed the brush or branches to and through the housing.

5. Apparatus for gathering up and cutting brush, branches, or the like, comprising a wheeled frame, a feeding housing mounted upon the frame, a rotary cutting element mounted within the housing and having its axis of rotation extending transversely of the direction of travel of the wheeled frame, a stationary blade for co-action with the rotary cutting element, upper and lower feeding devices mounted within the housing and converging rearwardly toward the rotary cutting element, means to gather up the brush or branches and supply the same into the feeding housing between the feeding devices, and means to positively drive the rotary cutting element and the feeding devices, the arrangement being such that the feeding devices compress the brush or branches and feed the same to the rotary cutting element, and the rotary cutting element serves to aid in this feeding movement while cutting the brush or branches.

6. Apparatus for gathering up and cutting brush or branches, comprising a wheeled frame, a rake secured to the forward end of the wheeled frame, a housing mounted upon the frame and extending forwardly over a portion of the rake, a horizontal rotary cutting element mounted within the housing and having its axis of rotation disposed transversely of the direction of travel of the frame, a stationary blade arranged near the rotary cutting element, upper and lower rearwardly converging sets of rotary feeding rolls arranged within the housing forwardly of the rotary cutting element, and positive means to drive the rotary cutting element and the rotary feeding rolls, the arrangement being such that the sets of rotary feeding rolls compress the brush or branches and feed the same to the rotary cutting element, and the action of the rotary cutting element aids in such feeding movement while serving to cut the brush or branches.

In testimony whereof I affix my signature.
ROY M. ROWE.